(12) United States Patent
Majchrzak et al.

(10) Patent No.: US 7,220,946 B2
(45) Date of Patent: May 22, 2007

(54) FOOD CONTAINER

(75) Inventors: Mike Majchrzak, Milwaukee, WI (US); Allan Witt, Lenoir, NC (US); David Rolston, Milwaukee, WI (US)

(73) Assignee: Hatco Corporation, Milwaukee, WI (US)

(*) Notice: Subject to any disclaimer, the term of this patent is extended or adjusted under 35 U.S.C. 154(b) by 0 days.

(21) Appl. No.: 10/763,726

(22) Filed: Jan. 23, 2004

(65) Prior Publication Data

US 2005/0173397 A1 Aug. 11, 2005

(51) Int. Cl.
*A21B 1/24* (2006.01)
*A21B 1/26* (2006.01)
*A21B 3/02* (2006.01)
*A21B 3/04* (2006.01)

(52) U.S. Cl. ............... 219/401; 219/400; 219/214; 99/474; 126/21 A

(58) Field of Classification Search .......... 219/400, 219/401, 214; 99/474–476; 312/236
See application file for complete search history.

(56) References Cited

U.S. PATENT DOCUMENTS

| | | | |
|---|---|---|---|
| 3,292,525 A | 12/1966 | Jensen | |
| 3,628,447 A | 12/1971 | Levenback | |
| 3,780,794 A | 12/1973 | Staub | |
| 3,942,426 A * | 3/1976 | Binks et al. | 219/400 |
| 4,013,869 A | 3/1977 | Orts | |
| 4,038,968 A * | 8/1977 | Rovell | 219/400 |
| 4,039,776 A | 8/1977 | Roderick | |
| 4,089,322 A | 5/1978 | Guibert | |
| 4,147,924 A | 4/1979 | DeWitt, Jr. | |
| 4,165,620 A * | 8/1979 | Gehauf nee Kiesel et al. | 99/476 |
| 4,281,636 A | 8/1981 | Vegh et al. | |
| 4,377,109 A | 3/1983 | Brown et al. | |
| 4,381,443 A * | 4/1983 | Guibert | 219/400 |
| 4,386,558 A | 6/1983 | Holman et al. | |
| 4,426,923 A * | 1/1984 | Ohata | 126/20 |
| 4,437,396 A * | 3/1984 | Plattner et al. | 99/475 |
| 4,455,478 A | 6/1984 | Guibert | |
| 4,617,908 A | 10/1986 | Miller et al. | |
| 4,623,780 A | 11/1986 | Shelton | |
| 4,635,540 A | 1/1987 | Dowds | |
| 4,655,192 A | 4/1987 | Jovanovic | |
| 4,772,268 A | 9/1988 | Bates | |
| 4,835,351 A * | 5/1989 | Smith et al. | 219/400 |

(Continued)

FOREIGN PATENT DOCUMENTS

JP    JP 2000-175781    6/2000

(Continued)

OTHER PUBLICATIONS

DECO-TECH Air Curtain Cold Pan, May 2002, 2 pages, Revision 2.3, Kevry Corporation, Innovative Design and Fabrication, U.S.A.

(Continued)

*Primary Examiner*—Joseph Pelham
(74) *Attorney, Agent, or Firm*—Foley & Lardner LLP

(57) ABSTRACT

The present description relates to a food container which comprises at least one opening through which food is moved and a humidity source in fluid contact with an air stream providing humidity to the air stream. The air stream is directed across the opening to form a barrier between the interior of the container and the exterior environment.

17 Claims, 5 Drawing Sheets

U.S. PATENT DOCUMENTS

| | | | |
|---|---|---|---|
| 4,876,426 A * | 10/1989 | Smith ........................ 219/401 |
| 4,995,313 A | 2/1991 | Delau et al. |
| 5,039,535 A | 8/1991 | Lang et al. |
| 5,072,666 A | 12/1991 | Hullstrung |
| 5,203,258 A | 4/1993 | Tippmann et al. |
| 5,241,947 A | 9/1993 | Sandolo |
| 5,272,963 A | 12/1993 | Del Fabbro |
| 5,361,684 A * | 11/1994 | Cattaneo ...................... 99/410 |
| 5,532,456 A * | 7/1996 | Smith et al. ................ 219/400 |
| 5,715,745 A | 2/1998 | Blanton, Jr. et al. |
| 5,771,789 A | 6/1998 | Davis |
| 5,802,963 A * | 9/1998 | Cohn et al. ................... 99/476 |
| 5,947,012 A | 9/1999 | Ewald et al. |
| 5,992,301 A | 11/1999 | Mukumoto |
| 6,069,344 A | 5/2000 | Krasznai et al. |
| 6,098,527 A | 8/2000 | Chang |
| 6,114,659 A * | 9/2000 | Finck et al. ................ 219/214 |
| 6,250,215 B1 * | 6/2001 | Brenn ........................ 219/401 |
| 6,358,548 B1 | 3/2002 | Ewald et al. |
| 6,369,362 B1 * | 4/2002 | Brenn ........................ 219/401 |
| 6,454,176 B1 | 9/2002 | Burkett et al. |
| 6,474,222 B1 | 11/2002 | Pretre |
| D480,260 S | 10/2003 | Domi et al. |
| 6,670,585 B2 | 12/2003 | Burkett et al. |
| 6,742,344 B2 | 6/2004 | Vormedal |
| 2002/0005686 A1 * | 1/2002 | Nuttall et al. ............... 312/236 |
| 2003/0172670 A1 | 9/2003 | Vormedal |

FOREIGN PATENT DOCUMENTS

WO      WO00/36958      6/2000

OTHER PUBLICATIONS

Fried Food Holding Station, Model FFHS-27, date unknown, 2 pages, Merco Savory, Fort Wayne, IN.

HPT Heated Pass-Thru, September 2001, 2 pages, Bulletin No. 818-0404, Frymaster, L.L.C., Shreveport, Louisiana.

* cited by examiner

FOOD CONTAINER

BACKGROUND

The subject matter described herein relates generally to the field of containers. In particular, the subject matter described herein relates to food containers. The food containers may be used for storing food, holding food at temperature, cooling food, humidifying food, rethermalizing food, warming food, and/or cooking food.

A wide variety and configuration of food containers are used to house and display food in places such as convenience stores, restaurants, etc. Depending on the type of food, these containers may be heated, cooled, and/or humidified to prevent the food from becoming cold and/or hard, thus making the food more appealing to consumers. For example, the containers may be used to house and display donuts, pastries, hot dogs, etc. In other applications, the containers may be used to refrigerate and/or freeze food to prevent it from melting, spoiling, etc. In still other applications, the containers may be used to hold food at elevated temperature or to cook food.

Typically, a solid barrier such as a door is used to isolate the interior of the container from the exterior environment. The door prevents the transfer of heat and/or humidity between the interior of the container and the exterior environment. The door is usually hinged on one side so that it can be opened and closed to provide access to the interior of the container. Unfortunately continually opening and closing the door may result in a loss of productivity and efficiency on the part of the persons using the containers. Users often desire to quickly remove items from the containers. For example, in a fast food setting, a food preparer may want to be able to quickly access food components (e.g., hot dog buns, hot dogs) to prepare the finished food product (e.g., a hot dog in the bun with desired toppings). In other situations, the container may be provided with an opening that does not include a barrier between the exterior environment and the interior of the container. This arrangement results in a loss of efficiency due to excess heating, cooling, and/or humidifying. Accordingly, it would be desirable to provide an improved food container for housing items such as food.

It should be understood that the claims define the scope of the subject matter for which protection is sought, regardless of whether any of the aforementioned disadvantages are overcome by the subject matter covered by the claims. Also, the terms recited in the claims should be given their ordinary and customary meaning as would be recognized by those of skill in the art, except, to the extent a term is used herein in a manner more expansive than its ordinary and customary meaning, the term should be given its ordinary and customary meaning plus the additional expansive meaning, or except if a term has been explicitly defined to have a different meaning by reciting the term followed by the phase "as used herein shall mean" or similar language. Accordingly, the claims are not tied to any particular embodiment, feature, or combination of features other than those explicitly recited in the claims.

SUMMARY

One embodiment relates to a food container which comprises at least one opening through which food is moved and a humidity source in fluid contact with an air stream providing humidity to the air stream. The air stream is directed across the opening to form a barrier between the interior of the container and the exterior environment.

Another embodiment relates to a food container which defines at least one opening through which food is moved. An air curtain system provides a humidified air curtain over the opening.

Another embodiment relates to a container comprising a heating element disposed in the container, at least one opening through which food is moved between the interior and exterior of the Container, and at least one duct configured to direct an air stream across the opening to form a barrier between the interior of the container and the exterior environment. The heating element is used to at least one of cook food, rethermalize food, and maintain food at a temperature.

Another embodiment relates to a container comprising at least one opening through which items are moved between the interior and the exterior of the container, a support surface in the container for supporting the items, and an air curtain system providing an air curtain over the opening. A portion of the air stream flowing over and around the items.

Another embodiment relates to a container comprising at least one opening through which items are moved between the interior and the exterior of the container and a duct system configured to direct an air stream across the opening, the duct system comprising a plurality of air returns. At least one of the air returns is positioned adjacent to the opening and receives at least a portion of air stream. The portion of the air stream forming a barrier between the interior of the container and the exterior environment. The items are configured to be positioned substantially between at least another one of the air returns and the opening. The another one of the air returns being configured to receive another portion of the air stream.

Another embodiment relates to a container comprising at least one opening through which items are moved out of the container, an air curtain provided over the opening to form a barrier between an interior environment of the container and an exterior environment, and a first side positioned substantially opposite the opening. The first side comprising at least one air return which is configured to receive a portion of the air from the air curtain.

Another embodiment relates to a container comprising at least one opening through which items are moved between the interior and exterior of the container and an air curtain provided over the opening to form a barrier between the interior of the container and the exterior environment. The air in the air curtain is used to maintain the temperature and the humidity of the interior of the container at substantially controlled levels.

Another embodiment relates to a container configured to house food comprising at least one fan configured to output an air stream and a baffle configured to receive the air stream from the fan. The air stream from the baffle passes over a water source to humidify the air stream. The humidified air stream is circulated in the container to maintain the water content of the food at or above a set level.

DRAWINGS

DESCRIPTION

Figure 1:
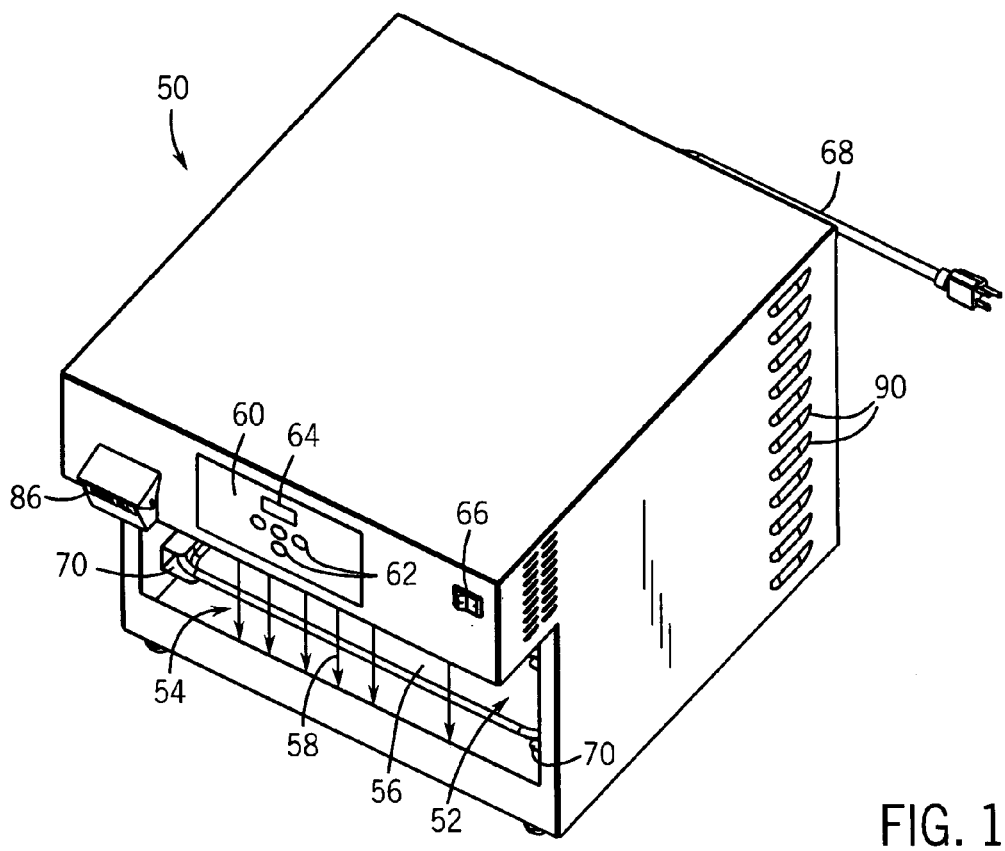
FIG. 1 is a top perspective view of a container according to one embodiment.
Figure 2:
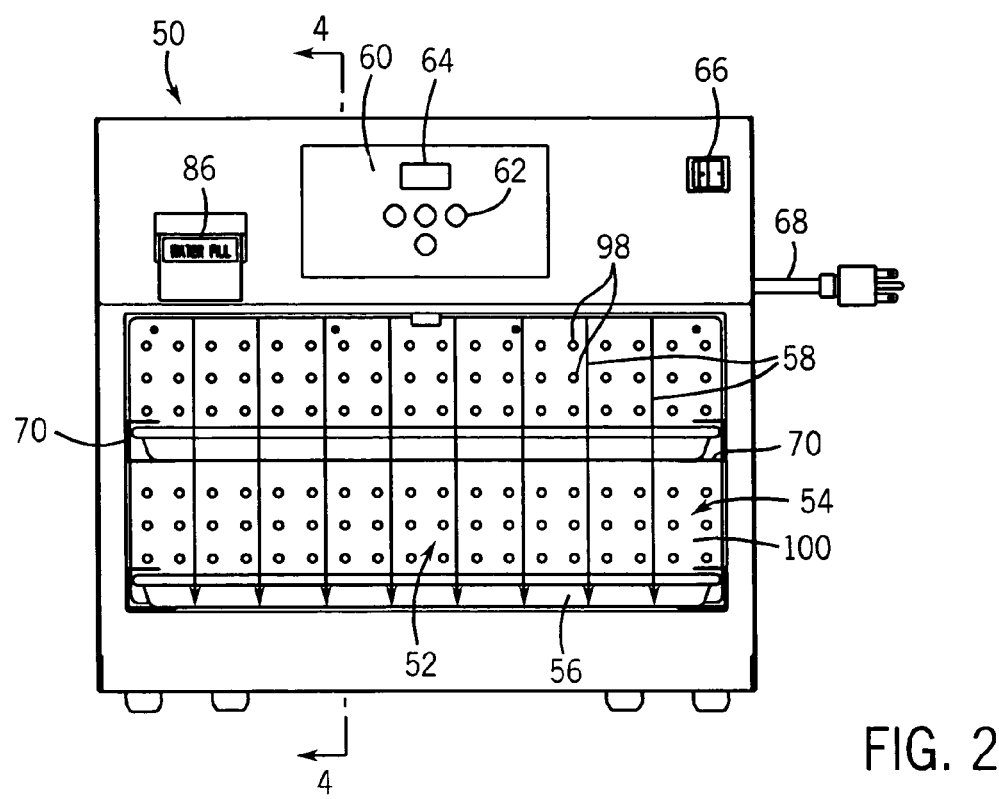
FIG. 2 is a front elevation view of the container from FIG. 1.
Figure 3:
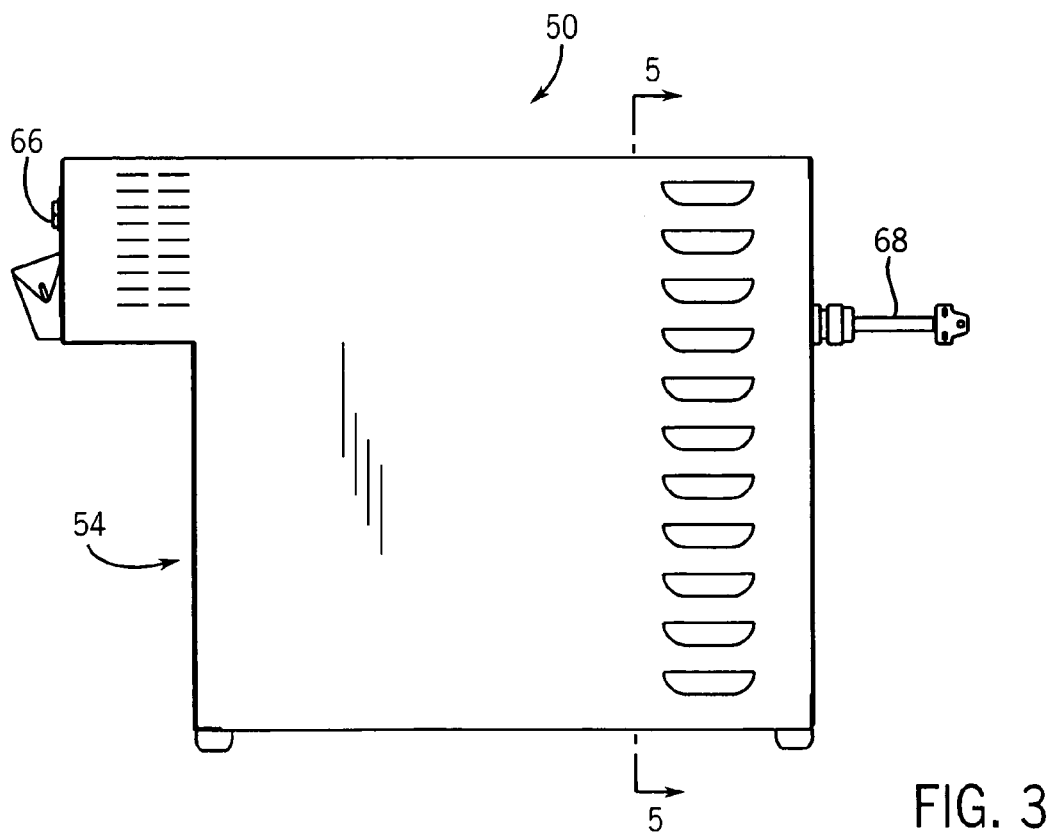
FIG. 3 is a side elevation view of the container from FIG. 1.

FIGS. 1, 2, and 3 show a top perspective, front perspective, and side elevation views, respectively, of a container 50 according to one embodiment. Container 50 comprises an interior chamber 52, which is configured to house items such as food in a controlled environment. Container 50 shown in FIGS. 1–9 is shaped similarly to a box with an opening 54 on one side for moving food between the interior and the exterior of container 50. In other embodiments, container 50 may be any of a number of suitable shapes and configurations. For example, container 50 may be substantially cylindrical, etc. Also, container 50 may be configured to be portable (e.g., moved by hand, rolled on castors, etc.) or fixed in a stationary position using a suitable fastening mechanism (e.g., welding, bolted, glued, etc.). In the embodiment shown in FIGS. 1–9, container 50 is configured to be placed on top of a countertop or table. In another embodiment, opening 54 may be located on a top side of container 50. In still another embodiment, container 50 may comprise two, three, or more openings 54 for moving food between the interior and the exterior of container 50. In yet another embodiment, container 50 may comprise transparent sides (e.g., glass, plastic, etc.) so that the food is visible.

In one embodiment, container 50 comprises a control system, which is used to maintain the physical characteristics (e.g., temperature, humidity, etc.) of the air in chamber 52 substantially constant. The control system is typically configured to control both temperature and humidity of the air in chamber 52. However, in other embodiments, the control system may be configured to control only one of the temperature and humidity of the air in chamber 52 or may be configured to control additional properties of the air in chamber 52 such as the air's speed. In general, the control system includes any of the components, structure, and matter that is used to control the temperature and humidity of the air in container 50. In one embodiment, the control system comprises at least a thermometer and/or a hygrometer. In another embodiment, the control system comprises a thermostat and/or a humidistat which are used to control the temperature and/or humidity, respectively, of the air in chamber 52. In still another embodiment, the control system may comprise infinite controls for controlling the temperature and/or humidity of the air in chamber 52.

Control panel 60 may be used to provide input (e.g., set levels for temperature, humidity, etc.) to the control system. In one embodiment, as shown in FIGS. 1–3, control panel 60 comprises buttons 62 and display 64. Buttons 62 may be used to input the desired temperature and/or humidity level. Display 64 is configured to show the user the set and/or actual temperature and/or humidity levels. In addition, container 50 also comprises a power on/off switch 66 and a power cord 68. In other embodiments, control panel 60 may comprise other input devices and/or displays. For example, control panel 60 may comprise rotary dials instead of buttons 62. Also, control panel 60 may be distributed on container 50. For example, display 64 may be located on one side of container 50 and buttons 62 may be located on another side of container 50. In yet another embodiment, container 50 may be supplied with a computer interface for interfacing with a computerized control system or a computerized information source.

As mentioned previously, container 50 defines at least one opening 54 through which food may be moved between the interior and the exterior of container 50. Opening 54 may be any suitable size and shape. In the embodiment shown in FIGS. 1–3, opening 54 is quadrilateral and substantially planar. Opening 54 may be positioned in a substantially vertical plane, as shown in FIGS. 1–3, or may be positioned in a number of other planes (e.g., a substantially horizontal plane for a container where opening 54 is on a top side or a plane at any degree of inclination between a horizontal plane and a vertical plane).

In the embodiment shown in FIGS. 1 and 2, trays 56 are used to support food (e.g., pastries, brownies, hot dogs, etc.). Trays 56 are of a sufficient size to pass through opening 54 and be received by rails 70 in chamber 52. In other embodiments, food may be moved between the interior and the exterior of container 50 in a variety of other suitable ways (e.g., individual food items placed in container 50 without using trays 56, etc.).

Container 50 uses an air curtain 58 to form a barrier between interior chamber 52 of container 50 and the exterior environment. A user can easily reach through, or otherwise pierce, air curtain 58 to move food between the interior and the exterior of container 50. Thus, air curtain 58 provides an effective barrier between chamber 52 and the exterior environment yet eliminates the need for the user to open a door while moving food into and out of container 50. Air curtain 58 may also provide an effective barrier against insects and other foreign matter that may otherwise enter chamber 52. Also, a portion of the air from air curtain 58 may be used to humidify, cool, and/or heat the interior of container 50.

Figure 4:
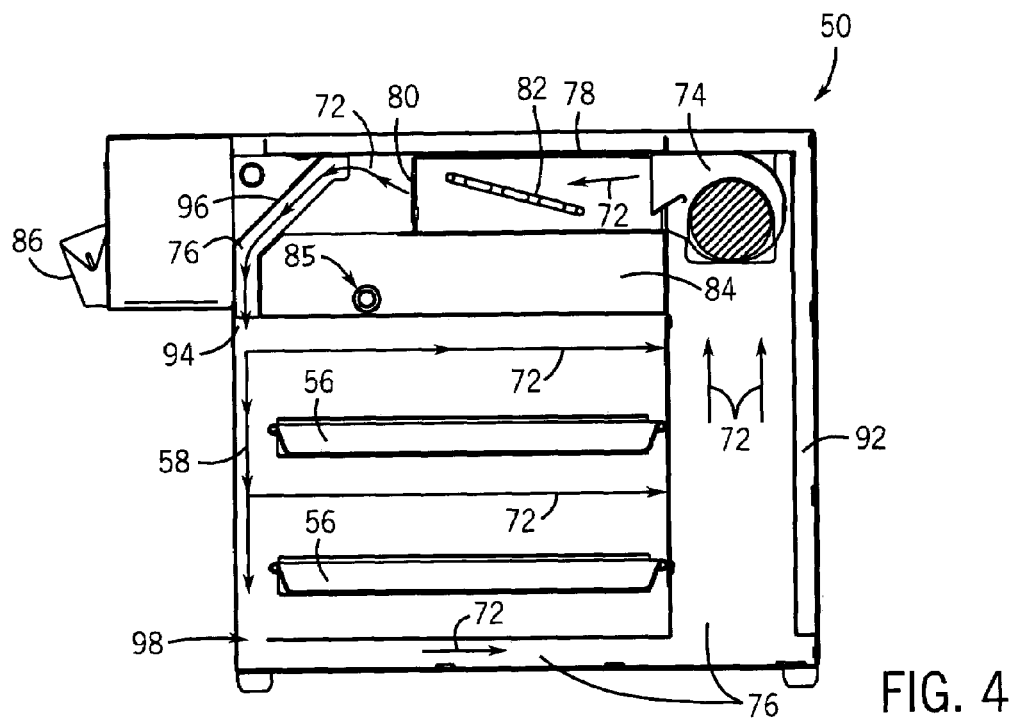
FIG. 4 is a cross-sectional side view of the container from FIG. 2 along line 4—4.

Referring to FIG. 4, a cross-sectional side view of container 50 along line 4–4 in FIG. 2 is shown. Container 50 comprises at least one fan 74 and a duct system 76 which are configured to circulate air stream 72 through container 50. In general, fans 74 are electrically operated and are configured to provide a constant air flow rate. In another embodiment, fans 74 may be adjustable to provide varying controlled (actively or passively) air flow rates. Fans 74 are provided with outside ventilation using louvers 90, which allow air to enter a ventilation space 92. Air that enters louvers 90 may be used to prevent fans 74 from overheating. Ambient air that enters louvers 90 is kept separate from air stream 72. In another embodiment, air stream 72 may comprise ambient air that is continually being combined with circulated air. In another embodiment, air stream 72 may comprise only ambient air that is brought in through a vent then expelled back into the ambient environment after it has been used to create air curtain 58.

Figure 6:
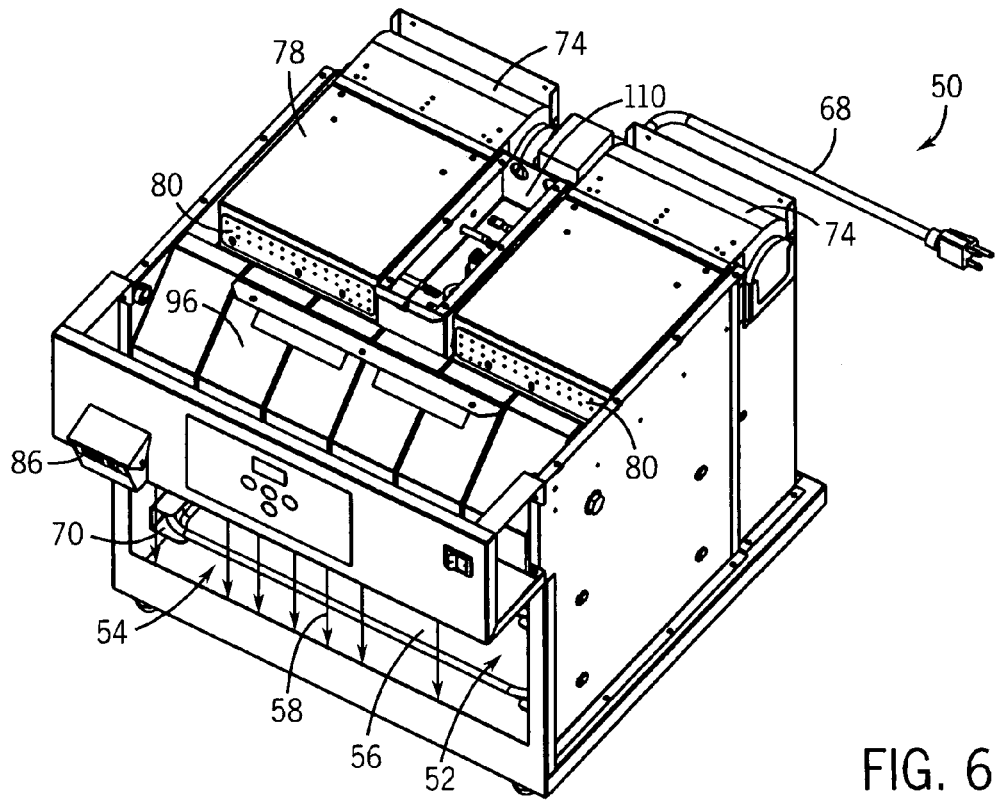
FIG. 6 is a top perspective view of the container from FIG. 1 with the outside covers removed.
Figure 7:
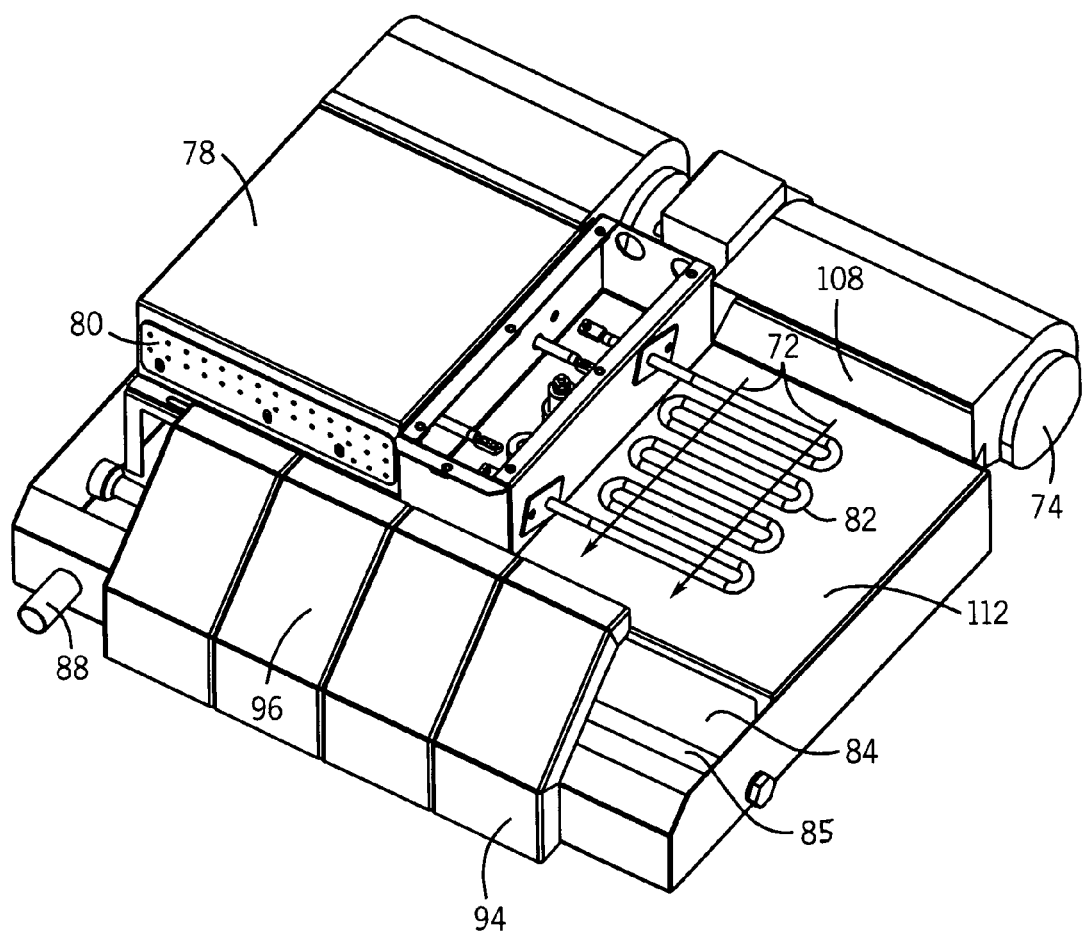
FIG. 7 is a top perspective view of the container from FIG. 6 with additional covers removed.

In FIG. 4, the general flow of an air stream 72 is shown. As shown in FIGS. 4, 6, and 7, fans 74 blow air into a baffle box 78. Baffle box 78 is a substantially enclosed box comprising a baffle 80 through which air stream 72 is forced to pass. Before passing through baffle 80, air stream 72 may be heated using heating element 82. In other embodiments, heating element 82 may be located in any suitable position in duct system 76. After being heated, air stream 72 passes through baffle 80. In the embodiment shown in FIGS. 4, 6, and 7, baffle 80 comprises a perforated, substantially planar, plate. Typically, the perforations in baffle 80 are also substantially uniform. As air stream 72 passes through the perforations in baffle 80, the velocity of air stream 72 increases briefly before slowing down on the other side of baffle 80. Also, baffle 80 provides a pressure drop.

After passing through baffle 80, air stream 72 passes over water source 84 to humidify air stream 72. Once air stream 72 exits baffle 80 the velocity of air stream 72 decreases substantially. The decrease in velocity of air stream 72 and/or the pressure drop across baffle 80 allows air stream 72 to pick up water from water source 84 better than if baffle 80 was not present. Water source 84 comprises a heating element 85 which can be used to heat the water and provide a controlled amount of water vapor to be picked up by air stream 72. Water source 84 is filled using water input 86. Water placed in water input 86 passes through water tube 88 to water source 84. In another embodiment, water source 84 may be coupled to a continuous water supply that refills water source 84 when it gets low (e.g., a float with a valve that turns on when the water level of water source 84 is low). In other embodiments, container 50 may be configured without a water source 84 or any system for humidifying air stream 72. This may be desirable in connection with foods that do not need to be humidified.

After passing over water source 84, air stream 72 travels through duct 96, which is a part of duct system 76. As air stream 72 enters duct 96, the velocity of air stream 72 increases due to the smaller area through which air stream 72 now passes. Air stream 72 exits duct 96 through nozzles 94, which are positioned adjacent opening 54 in a downward direction. As air stream 72 passes downward over opening 54, air curtain 58 is created. Air from air curtain 58 returns back to fans 74 through a plurality of air returns 98 in duct system 76. At least one of air returns 98 is positioned adjacent to opening 54 opposite nozzles 94. Air returns 98 positioned opposite nozzles 94 receive a portion of air stream 72 that exits nozzles 94. This portion typically includes most of air stream 72. At least one of air returns 98 is positioned on a first side 100 of chamber 52. Generally, first side 100 is positioned opposite opening 54. Food placed in trays 56 is positioned substantially between air returns 98 positioned on first side 100 and opening 54. A portion of air stream 72 passes over and/or around the food before entering air returns 98 positioned on first side 100. Thus, the water content of the food, temperature and/or humidity of the air in chamber 52 may be controlled using air from air stream 72. In one embodiment, the air from air stream 72 is used to maintain the temperature and/or humidity of chamber 52 substantially constant without the use of additional temperature and/or humidity control systems.

Figure 5:
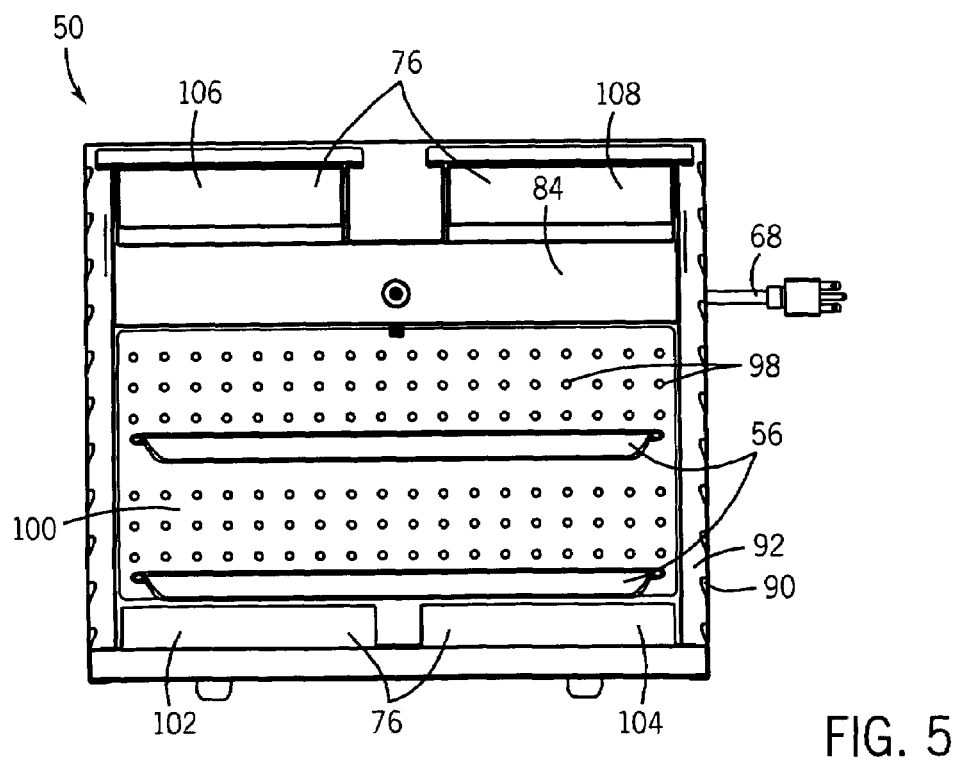
FIG. 5 is a cross-sectional front view of the container from FIG. 3 along line 5—5.

As shown in FIGS. 2 and 5, first side 100 is perforated according to a substantially uniform pattern to provide a plurality of distributed air returns 98. In one embodiment, the size of the perforations is between approximately 3 millimeters and approximately 10 millimeters or, desirably, between approximately 5 millimeters and approximately 8 millimeters. In still another embodiment, first side 100 is configured to include a higher density of air returns 98 and/or all of air returns 98 near trays 56. This allows the portion of air stream 72 that passes through the air returns on first side 100 to be nearer to the food, thus enhancing the heat transfer and/or humidification of the food. In other embodiments, first side 100 may comprise a single air return 98 located in any suitable position. After air stream 72 passes through air returns 98, air stream 72 travels through duct system 76 back to fans 74 to begin the cycle again.

Referring to FIG. 5, a cross-sectional front view of container 50 along line 5—5 in FIG. 3 is shown. Duct system 76 comprises two separate ducts 102 and 104 through which air is returned from chamber 52 to fans 74. Also, each fan 74 has separate outlet ducts 106 and 108. In other embodiments, duct system 76 may comprise a single duct to circulate air stream 72 through container 50. In still other embodiments, duct system 76 may comprise a filter to capture any particles that may dislodge from the food as it is passed through air curtain 58.

Referring to FIGS. 6 and 7, a top perspective view of container 50 with the outside covers removed is shown. FIGS. 6 and 7 provide a top perspective view of fans 74, baffle box 78, baffles 80, ducts 96, and wiring enclosure 110. Wiring enclosure 110 houses electrical wires that provide power to heating elements 82 as well as other electrical devices. FIG. 7 shows container 50 with one of baffle boxes 78 removed. Underneath baffle boxes 78 are covers 112, which cover water source 84. Covers 112 help to isolate water source 84 from heating elements 82. Air stream 72 exits fan outlet ducts 106 and 108, travels through baffle boxes 78 and into ducts 96.

Figure 8:
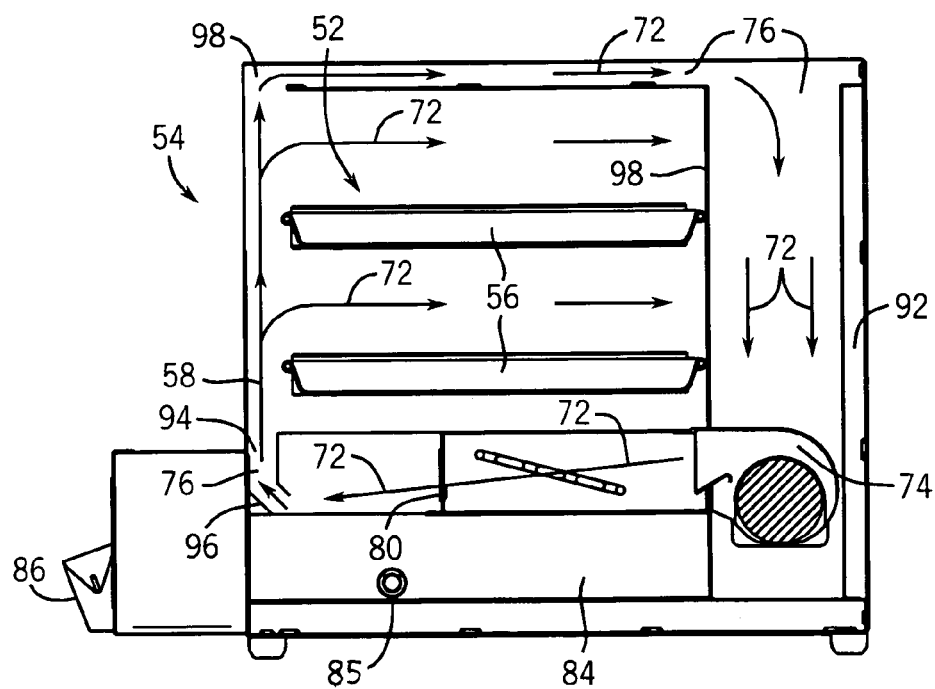
FIG. 8 is a cross-sectional side view of a container according to another embodiment.

Referring to FIG. 8, a cross-sectional side view of container 50 is shown according to another embodiment. In this embodiment, fan 74, baffle 80, and water source 84 are located at the bottom of container 50. Fan 74 is configured to circulate air through container 50 in a manner similar to the previous embodiments. However, in this embodiment, the air in air curtain 58 flows upward from nozzles 94 to air returns 98.

Figure 9:
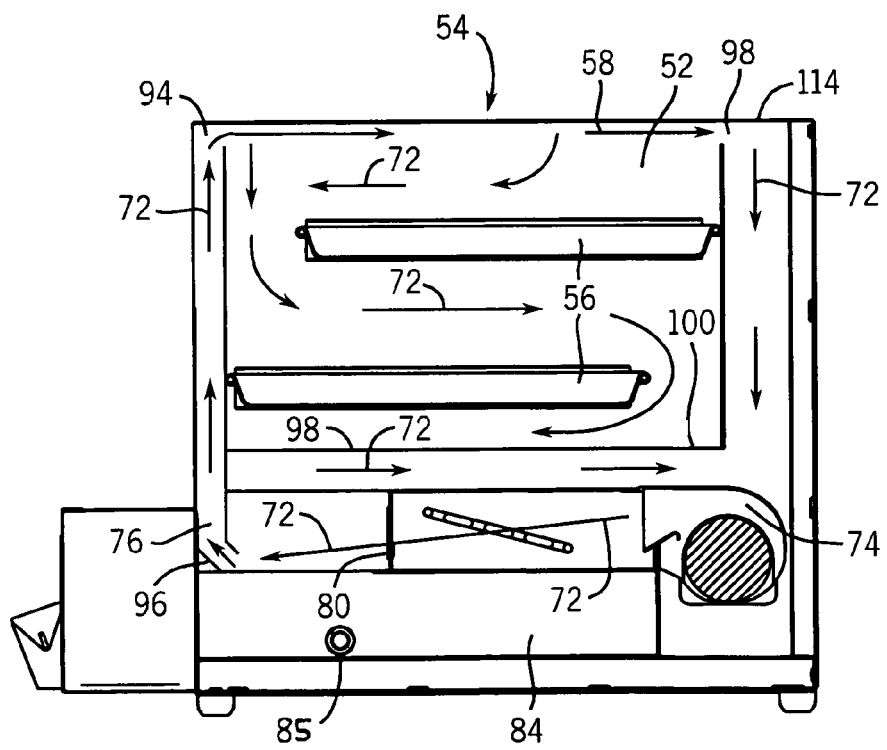
FIG. 9 is a cross-sectional side view of a container according to another embodiment.

In FIG. 9, a cross-sectional side view of container 50 is shown according to another embodiment. In this embodiment, a top side 114 of container 50 comprises opening 54. Accordingly, air curtain 58 is substantially horizontal and provides a barrier between chamber 52 and the exterior environment. The majority of the air from air curtain 58 is received by one or more air returns 98 positioned adjacent to opening 54 and opposite nozzles 94 while the remainder is received by air returns 98 positioned in a bottom side 116 of container 50. This embodiment may also include any other features described or discussed in relation to other previous embodiments.

The construction and arrangement of the elements described herein are illustrative only. Although only a few embodiments have been described in detail in this disclosure, those of ordinary skill who review this disclosure will readily appreciate that many modifications are possible without materially departing from the novel teachings and advantages of the subject matter recited in the claims. Accordingly, all such modifications are intended to be included within the scope of the methods and systems described herein. The order or sequence of any process or method steps may be varied or re-sequenced according to alternative embodiments. Other substitutions, modifications, changes and omissions may be made in the design, operating conditions and arrangement of the embodiments without departing from the spirit and scope of the methods and systems described herein.

What is claimed is:

1. A container for holding food items at an elevated temperature and humidity, the container comprising:
    at least one opening which provides access to move food items into and/or out of the interior of the container, the interior of the container being heated and humidified;
    a duct system configured to direct an air stream across the opening, the duct system comprising a plurality of air returns; and
    a baffle positioned in the duct system adjacent to a water source which is used to humidify the air stream;

wherein at least one of the air returns is positioned to receive at least a portion of the air stream so that a barrier is formed between the interior of the container and an exterior environment; and wherein the container is configured so that the food items are positioned substantially between at least another one of the air returns and the opening, the another one of the air returns being configured to receive another portion of the air stream.

2. The container according to claim 1, wherein the container is portable.

3. The container according to claim 1, comprising a control system configured to control the temperature and/or humidity of the interior of the container.

4. The container according to claim 3, wherein the air stream is used to heat and/or humidify the interior of the container.

5. The container according to claim 1, comprising a fan which is used to move the air stream through the duct system.

6. The container according to claim 1, wherein the another one of the air returns is positioned on a side of the container which is at least substantially opposite the opening.

7. The container according to claim 1, wherein the air stream is used to humidify the interior of the container.

8. A container comprising:
at least one opening which provides access to move food items into and/or out of the container;
an air curtain positioned over the opening to form a barrier between the interior of the container and an exterior environment, the interior of the container being heated;
a first side positioned substantially opposite the opening, the first side comprising at least one air return which is configured to receive a portion of the air from the air curtain wherein a majority of air received by the at least one air return in the first side comes from the air curtain; and
a duct system which directs air over the opening to form the air curtain and a baffle positioned in the duct system, wherein the baffle is positioned adjacent to a water source which is used to humidify the air used to form the air curtain.

9. The container according to claim 8, comprising a fan configured to circulate the air in the air curtain through the container.

10. The container according to claim 8, wherein the at least one opening is substantially planar.

11. The container according to claim 8, comprising a control system configured to control the temperature and/or humidity of the interior of the container.

12. The container according to claim 8, wherein the container is configured so that the food items are positioned substantially between the at least one air return and the at least one opening.

13. A container comprising:
at least one opening which provides access to move food items into and/or out of the interior of the container, the interior of the container being heated; and
a duct system configured to circulate an air stream in a single loop in the container, the duct system being configured to direct at least a portion of the air stream across the opening to form an air curtain;
wherein the container is configured so that air travels from the air curtain through the interior of the container adjacent to the food items to at least one opening in the duct system; wherein the at least one opening in the duct system is positioned at least substantially opposite the at least one opening which provides access to the interior of the container.

14. A container comprising:
at least one opening which provides access to move food items into and/or out of the interior of the container, the interior of the container being heated and humidified; and
a duct system configured to circulate an air stream in a single loop in the container, the duct system being configured to direct at least a portion of the air stream across the opening to form an air curtain;
wherein the container is configured so that a portion of the air stream travels between the air curtain and at least one opening in the duct system through the interior of the container adjacent to the food items;
wherein the at least one opening in the duct system is positioned at least substantially opposite the at least one opening which provides access to the interior of the container.

15. A container comprising:
at least one opening which provides access to move food items into and/or out of the interior of the container, the interior of the container being heated and humidified; and
a duct system configured to circulate an air stream in the container, the duct system being configured to direct at least a portion of the air stream across the opening to form an air curtain;
wherein the container is configured so that a portion of the air stream travels between the air curtain and at least one opening in the duct system through the interior of the container adjacent to the food items;
wherein the air stream passes over a water source which humidifies the air stream and wherein the air stream impacts a baffle positioned over the water source.

16. The container according to claim 15, wherein the speed of the air stream as it passes over the water source is less than the speed of the air in the air curtain.

17. The container according to claim 15, wherein the water source is heated.

* * * * *